United States Patent
Seifert et al.

(10) Patent No.: US 7,684,911 B2
(45) Date of Patent: Mar. 23, 2010

(54) SUSPENSION CONTROL CALIBRATION INTEGRITY

(75) Inventors: Mark A. Seifert, Howell, MI (US); Kerfegar K. Katrak, Fenton, MI (US); Steven D. Palazzolo, Clinton Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1149 days.

(21) Appl. No.: 11/157,208

(22) Filed: Jun. 20, 2005

(65) Prior Publication Data

US 2006/0287790 A1    Dec. 21, 2006

(51) Int. Cl.
*G01M 17/00* (2006.01)
*G06F 7/00* (2006.01)

(52) U.S. Cl. ............... 701/37; 701/29; 280/5.504; 280/5.506; 280/5.5; 280/5.51

(58) Field of Classification Search .............. 701/29, 701/37, 38
See application file for complete search history.

(56) References Cited

U.S. PATENT DOCUMENTS

| | | | |
|---|---|---|---|
| 4,550,286 A * | 10/1985 | Holland et al. ............ | 324/503 |
| 4,754,824 A | 7/1988 | Olsson | |
| 4,800,974 A | 1/1989 | Wand et al. | |
| 5,037,128 A | 8/1991 | Okuyama et al. | |
| 5,150,916 A * | 9/1992 | Petrofes et al. .......... | 188/266.4 |
| 5,324,068 A * | 6/1994 | Kallenbach et al. ...... | 280/5.515 |
| 5,444,621 A * | 8/1995 | Matsunaga et al. ............ | 701/37 |
| 5,485,417 A | 1/1996 | Wolf et al. | |
| 5,570,289 A * | 10/1996 | Stacey et al. ................ | 701/37 |
| 5,787,375 A | 7/1998 | Madau et al. | |
| 6,097,999 A * | 8/2000 | Shal et al. ................... | 701/38 |
| 6,219,602 B1 | 4/2001 | Badenoch et al. | |
| 6,226,581 B1 * | 5/2001 | Reimann et al. .............. | 701/48 |
| 6,459,971 B1 | 10/2002 | Kurishige et al. | |
| 6,505,108 B2 | 1/2003 | Bodie et al. | |
| 6,725,135 B2 * | 4/2004 | McKeown et al. ............ | 701/29 |
| 7,076,351 B2 * | 7/2006 | Hamilton et al. .............. | 701/37 |
| 2002/0013647 A1 | 1/2002 | Kawazoe et al. | |
| 2002/0026270 A1 | 2/2002 | Kurishige et al. | |
| 2003/0001346 A1 | 1/2003 | Hamilton et al. | |
| 2003/0182036 A1 | 9/2003 | Shal et al. | |
| 2003/0195679 A1 * | 10/2003 | McKeown et al. ............ | 701/29 |
| 2004/0024509 A1 | 2/2004 | Salib et al. | |

(Continued)

FOREIGN PATENT DOCUMENTS

DE    4430364 B4    3/2005

(Continued)

OTHER PUBLICATIONS

USPTO, Prosecution History for U.S. Appl. No. 11/458,697.

(Continued)

*Primary Examiner*—Thomas G Black
*Assistant Examiner*—Wae Louie

(57) ABSTRACT

A vehicle includes a semi-active suspension including suspension dampers controllably adjustable in accordance with electronic stability control commands and ride and handling commands. Vehicle steering response states, turning direction states and vehicle dynamics states are binary coded in respective state variables and suspension control calibrations are binary coded in calibration words. Integrity and security of state variables and calibration words are ensured in efficient binary digit resource allocation schemes.

12 Claims, 5 Drawing Sheets

U.S. PATENT DOCUMENTS

| | | |
|---|---|---|
| 2004/0128044 A1 | 7/2004 | Hac |
| 2004/0133321 A1 | 7/2004 | Ghoneim et al. |
| 2004/0215380 A1 | 10/2004 | Song |
| 2004/0220708 A1* | 11/2004 | Owen et al. .................. 701/29 |
| 2005/0113998 A1 | 5/2005 | Kim |
| 2005/0246085 A1 | 11/2005 | Salib et al. |
| 2005/0256628 A1 | 11/2005 | Salib et al. |
| 2006/0105670 A1 | 5/2006 | Seymour |
| 2006/0273657 A1 | 12/2006 | Wanke et al. |
| 2006/0287790 A1* | 12/2006 | Seifert et al. .................. 701/37 |

FOREIGN PATENT DOCUMENTS

| | | |
|---|---|---|
| DE | 10360666 A1 | 7/2005 |

OTHER PUBLICATIONS

USPTO, Prosecution History for U.S. Appl. No. 11/157,207.

* cited by examiner

| VEHICLE TURNING DIRECTION | |
|---|---|
| LEFT | RIGHT |
| 0 \| 1 | 1 \| 0 |

*FIG. 3*

| COMBINED-VEHICLE DYNAMICS | | | |
|---|---|---|---|
| | OVERSTEER | UNDERSTEER | NEUTRAL STEER |
| LEFT | 0\|1\|0\|1 | 0\|1\|1\|0 | 1\|0\|0\|1 |
| RIGHT | 1\|0\|1\|0 | 1\|1\|0\|0 | 0\|0\|1\|1 |

| Left Front (LF) | | Right Front (RF) | | Left Rear (LR) | | Right Rear (RR) | | VEH DYN STATE CALIBRATION | VEH DYN STATE VARIABLE |
|---|---|---|---|---|---|---|---|---|---|
| Jounce | Rebound | Jounce | Rebound | Jounce | Rebound | Jounce | Rebound | | |
| 0 | 1 | 1 | 0 | 0 | 1 | 1 | 0 | Oversteer Left Active | 0101 |
| 1 | 0 | 0 | 1 | 1 | 0 | 0 | 1 | Oversteer Left Inactive | |
| 1 | 0 | 0 | 1 | 1 | 0 | 0 | 1 | Oversteer Right Active | 1010 |
| 0 | 1 | 1 | 0 | 0 | 1 | 1 | 0 | Oversteer Right Inactive | |
| 0 | 1 | 1 | 0 | 1 | 0 | 0 | 1 | Understeer Left Active | 0110 |
| 1 | 0 | 0 | 1 | 0 | 1 | 1 | 0 | Understeer Left Inactive | |
| 1 | 0 | 1 | 0 | 0 | 1 | 0 | 1 | Understeer Right Active | 1100 |
| 0 | 1 | 0 | 1 | 1 | 0 | 1 | 0 | Understeer Right Inactive | |

| Damping Motion/ Corner | | | | | | | | |
|---|---|---|---|---|---|---|---|---|
| | | Critical | | | | Non-critical | | | |
| | | LF | RF | LR | RR | LF | RF | LR | RR |
| Turn Direction | Right | Jounce | Rebound | Jounce | Rebound | Rebound | Jounce | Rebound | Jounce |
| | Left | Rebound | Jounce | Rebound | Jounce | Jounce | Rebound | Jounce | Rebound |

*FIG. 7*

SUSPENSION CONTROL CALIBRATION INTEGRITY

CROSS REFERENCE TO RELATED APPLICATIONS

The present invention is related to commonly assigned and co-pending U.S. patent application Ser. No. 11/157,207 filed on even date herewith.

TECHNICAL FIELD

The present invention is generally related to vehicle stability control. More particularly, the invention relates to integrity and flexibility of vehicular suspension control calibrations.

BACKGROUND OF THE INVENTION

Steering stability and performance of a vehicle are largely characterized by the vehicle's understeer and oversteer behavior. The vehicle is in an understeer condition if the vehicle yaw is less than the operator steering input, where turning the steering wheel more does not correct the understeer condition because the wheels are saturated. The vehicle is in an oversteer condition if the vehicle yaw is greater than the operator steering input. Surfaces such as wet or uneven pavement, ice, snow or gravel also present vehicle stability and handling challenges to the operator. Similarly, in a panic or emergency situation, such as during obstacle avoidance, an operator may react by applying too much steering or failing to counter-steer to bring the vehicle back to its intended path. In any of these cases, the actual vehicle steering path deviates from the intended steering path.

Vehicle stability controls have progressed from first generation systems based upon braking and traction control (braking and powertrain torque management) technologies to more recent systems including independent and coordinated controls of brake, powertrain, steering and suspension damping sub-systems. Typically, distributed control modules are employed to directly interface with respective actuators to effect the desired sub-system controls. Coordination and authority of such sub-system control may be handled by way of a supervisory control.

Braking and traction control sub-systems can effect understeer and oversteer stability enhancements. Such sub-systems rely on wheel speed, steering angle, vehicle speed, yaw rate and other considerations to reduce engine torque and apply vehicle braking to maintain the vehicle travel along the intended path.

Active front steering sub-systems can effect understeer and oversteer stability enhancements. Such sub-systems employ a steering actuator system that relies upon an operator intended steering input from a hand wheel sensor, vehicle speed, vehicle yaw rate and other considerations, and provides a correction to the operator steering input to cause the vehicle to more closely follow the vehicle operator's intended steering path to increase vehicle stability and improve vehicle handling.

Semi-active suspension systems are also incorporated into some modern vehicles and are generally characterized by dampers that are controlled to change the suspension characteristics of the vehicle based on road conditions, vehicle speed, yaw rate and other considerations. Variable fluid-based dampers are known having discrete damping states and continuously variable damping states which affect both jounce and rebound response of the suspension system. Variability in damping may be attained by variable orifice devices or controlled viscosity fluids (e.g., magnetorheological (MR) or electrorheological (ER)) within the damping device. Variable dampers are used predominantly to achieve low speed ride comfort and high speed handling enhancement (ride and handling). However, variable damping techniques are known to enhance vehicle stability in certain understeer and oversteer situations and may be implemented as part of an overall vehicle stability control.

Whether implemented independently, overlapped or integrated, braking, traction, steering and suspension-based stability enhancement sub-systems all rely upon certain common vehicle level parameters. And, vehicle dynamics information, including vehicle steering response (e.g., understeer, oversteer or neutral steer), vehicle turning direction (e.g., left or right) or combinations thereof, defining vehicle dynamics states is commonly employed across stability enhancing sub-systems. Effective stability control systems, therefore, benefit from integrity and flexibility of use of such vehicle dynamics information.

Systematic reuse of control components—both within a vehicle's control architecture and across vehicle platforms and applications—promotes low-cost, quick-to-market and widely available vehicle systems. Significant benefits result directly from the application development cost, time, validation, maintainability and flexibility advantages afforded by such common control assets. Therefore, it is desirable that a vehicle stability enhancement system be characterized by a high degree of control component availability and access to enable and promote reuse, maintainability, common validation and development, cost and time savings and multi-platform utilization.

SUMMARY OF THE INVENTION

In accordance with various aspects of the present invention, a vehicle includes a computer based controller for effecting vehicle stability enhancement in response to certain driving conditions through responsive control of each of a plurality of independently controllable suspension units. A method for controlling the vehicle suspension includes providing a storage medium having a first pair of bits corresponding to jounce control and a second pair of bits corresponding to rebound control for each of a plurality of predetermined vehicle dynamics states and for each of the plurality of independently controllable suspension units wherein a first complementary arrangement of the first pair of bits corresponds to a first jounce control calibration, and wherein a second complementary arrangement of the first pair of bits corresponds to a second jounce control calibration, and wherein the first complementary arrangement of the second pair of bits corresponds to a first rebound control calibration, and wherein the second complementary arrangement of the first pair of bits corresponds to a second rebound control calibration. The method further includes determining which one of the plurality of the predetermined vehicle dynamics states is active and selecting from the storage medium the respective first and second pairs of bits for each of the plurality of independently controllable suspension units corresponding to the active one of the plurality of the predetermined vehicle dynamics states. Each of the plurality of independently controllable suspension units is controlled in accordance with the complementary arrangements of the respective first and second pairs of bits. In accordance with one aspect of the present invention, respective first and second pairs of bits are stored in predetermined ones of the first and second complementary arrangements in a non-volatile memory device. In accordance with another aspect of the present invention, respective first and second pairs of bits are set to ones of the first and second complementary arrangements in a read-write memory device as a function of predetermined vehicle operating parameters.

A computer-based vehicular suspension control system for controlling a plurality of independently controllable suspension units includes a programmable controller operating under the control of a program to control each of the plurality of independently controllable suspension units in accordance with calibrations corresponding to a plurality of predetermined vehicle dynamics states. The control system further includes a storage medium having a first pair of bits corresponding to jounce control and a second pair of bits corresponding to rebound control for each of the plurality of predetermined vehicle dynamics states and for each of the plurality of independently controllable suspension units wherein a first complementary arrangement of the first pair of bits corresponds to a first jounce control calibration, and wherein a second complementary arrangement of the first pair of bits corresponds to a second jounce control calibration, and wherein the first complementary arrangement of the second pair of bits corresponds to a first rebound control calibration, and wherein the second complementary arrangement of the first pair of bits corresponds to a second rebound control calibration. In accordance with another aspect of the present invention, the storage medium includes a non-volatile memory device and the respective first and second pairs of bits are stored therein in predetermined ones of the first and second complementary arrangements. In accordance with another aspect of the present invention, the storage medium comprises a read-write memory device and the respective first and second pairs of bits are periodically set therein to ones of the first and second complementary arrangements as a function of predetermined vehicle operating parameters.

These and other advantages and features of the invention will become apparent from the following description, claims and figures.

BRIEF DESCRIPTION OF THE DRAWINGS

FIG. 3 is a chart illustrating exemplary valid bit positional patterns of a variable embodied in a memory device for indicating vehicle turning direction states in accordance with the present invention;

FIG. 4 is a chart illustrating exemplary valid bit positional patterns of a variable embodied in a memory device for indicating vehicle dynamics states in accordance with the present invention;

FIG. 6 is a chart illustrating exemplary valid bit positional patterns for individual jounce and rebound control calibrations for each of four exemplary vehicle dynamics states at each of four exemplary independently controllable suspension units in accordance with the present invention; and FIG. 7 is a matrix illustrating critical and non-critical vehicle corner and damper motion combinations in accordance with vehicle turning direction.

DESCRIPTION OF THE PREFERRED EMBODIMENT

Figures 1, 2:
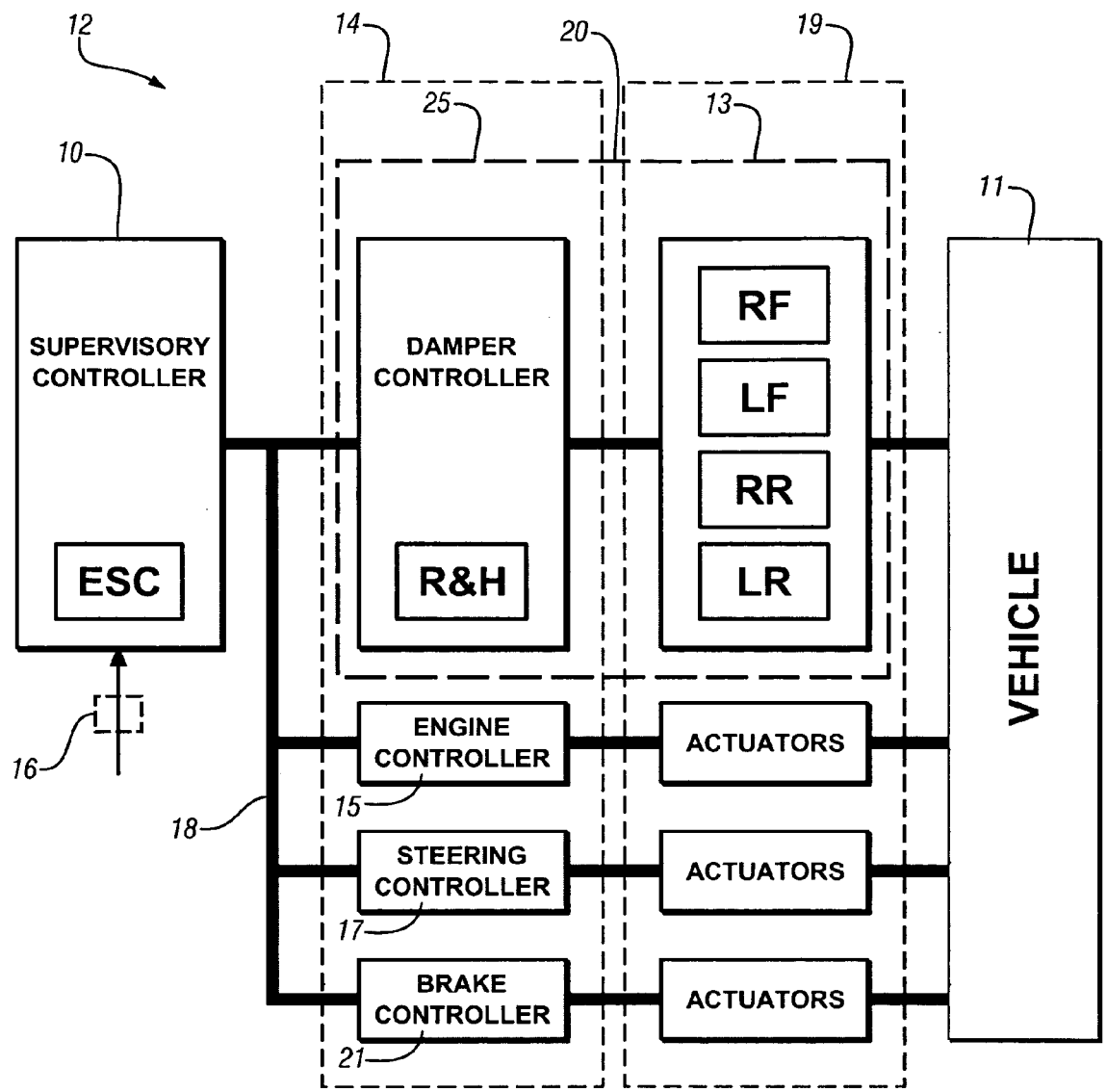
FIG. 1 is a block schematic diagram illustrating a vehicle architecture suitable for implementing vehicle stability control embodying the present invention.
FIG. 2 is a chart illustrating exemplary valid bit positional patterns of variables embodied in a memory device for indicating vehicle steering response states in accordance with the present invention.

A vehicle stability control system 12 is schematically illustrated in FIG. 1 and includes vehicle 11 and vehicle stability enhancement controller (supervisory controller) 10. A plurality of actuators 19 associated with various vehicle sub-systems effect various forces upon vehicle 11 to enhance stability and maintain an intended path in response to such inputs as steering wheel angle, vehicle speed, wheel speed and vehicle yaw rate, among others. For example, in an active front steering system, the steering angle of the front vehicle wheels is affected by way of a steering actuator sub-system that is commanded to effect the desired vehicle stability enhancement. In a braking/powertrain vehicle stability enhancement sub-system, individual wheel braking and powertrain torque may be affected by way of modulated hydraulic brake pressure and engine output torque control through a variety of well-known techniques (e.g., spark timing, cylinder deactivation, engine fueling, etc.). In a semi-active suspension sub-system, suspension damping characteristics may be altered in a manner to effect a desired vehicle stability enhancement. Other systems, including but not limited to active suspensions wherein spring rates are alterable, and active rear steering wherein rear wheel steering angle is alterable, are equally within the scope of application of the present invention.

Each such vehicle sub-system has associated therewith one or more sub-system control modules 14. Control modules are standard automotive computer-based devices with standard control and logic circuitry which may include a micro-controller including arithmetic logic unit (ALU) and memory devices including read-write or random access memory device (RAM), read-only memory (ROM) devices in which are stored a plurality of routines for carrying out sub-system control and diagnostic operations, including routines for carrying out operations for implementing various aspects of the present invention. Each routine includes a sequence of instructions that are executed by a microprocessor following pre-established events or interrupts or on a timed basis such as in standard executory loops. Such control modules are generally well-known to those skilled in the art.

Vehicle sub-systems are operable in a distributed control fashion wherein each of the control modules 14 associated with a particular sub-system is responsible for normal control functions thereof by commanding the control of the respective sub-system actuators 19. Such normal control functions generally are not related to vehicle dynamics control other than in a passive, contributory sense. Engine controller 15, for example, is responsible for effecting an amount of output torque in response to an operator demand and for torque management during ratio shifting of a multi-speed ratio automatic transmission. The engine controller also normally performs emission critical and fuel economy critical functions which may implicate spark timing, cylinder deactivation, engine fueling, etc. Brake controller 21 is normally responsible for brake application in accordance with operator applied brake pedal pressure and anti-lock modulation in accordance with independent and comparative wheel speed measurements. Steering controller 17 is responsible for variable assist—reducing steering effort during low speed and parking maneuvers and progressively increasing steering effort as vehicle speed increases. A four wheel steering control is also responsible for controlling the turn angle of the rear wheels in the opposite direction from the front wheels at low vehicle speeds and in the same direction at higher vehicle speeds. A damper controller 25 likewise is responsible for tuning the ride characteristics of the vehicle in accordance with vehicle speed, predominantly for operator comfort through reduced damping at low vehicle speeds and for improved highway feel through increased damping at higher vehicle speeds.

The vehicle 11, sub-system actuators 19 and sub-system controllers 14 all provide various input signals 16 to the supervisory controller 10 for use in vehicle stability enhancement routines. Vehicle inputs may include, for example, yaw rate, lateral acceleration and vehicle speed. Actuator inputs may include, for example, damper position and road wheel angle. Sub-system controller inputs may include, for example, individual brake corner actuation override, brake system blending terms, shock damping value override, active front steering actuator override or extra steering angle. Vehicle 11, sub-system actuators 19 and sub-system controllers 14 input signals may be provided over controller area network (CAN) bus 18, but may take the form of discrete sensor signal inputs, serial communication lines, etc. Supervisory controller 10 in turn provides high priority control commands over CAN bus 18 for overriding, modifying or adapting the normal control of the sub-system controllers 14 in the interest of implementing vehicle stability enhancing control of the various sub-system actuators 19.

Supervisory controller 10 may include lower-level supervisory controllers (not separately shown) corresponding to the various stability enhancing sub-systems (e.g., wheel torque (i.e., brake & engine torque) supervisor, steering supervisor and suspension supervisor) and oversees the coordination of these various stability enhancing control sub-system supervisors. The various sub-system controls, collectively or individually, in accordance with a particular vehicle application, are generally referred to as electronic stability control and illustrated as functionally related to supervisory controller 10 as ESC.

The schematic block diagram of FIG. 1 includes more detailed illustration of an exemplary suspension damper control sub-system 20 in accordance with the present invention. The system includes damper controller 25 and a plurality of suspension dampers 13 individually associated with the respective suspension corners of the vehicle 11. Damper control sub-system 20 includes the normal control functions generally referred to as ride and handling, illustrated as functionally related to damper controller 25 as R&H. The vehicle 11 provides a plurality of signals from sensors or derivations, including vehicle yaw rate, vehicle lateral acceleration, vehicle speed, steering wheel angle and individual damper positions. The plurality of suspension dampers 13 includes, in the present example of a conventional four wheel position vehicle, at least one suspension damper corresponding to each corner of the vehicle. These corners are referred to positionally and are correspondingly labeled in FIG. 1 as right-front (RF), left-front (LF), right-rear (RR) and left-rear (LR). Each damper effects a damping force upon vehicle 11 in accordance with damper commands, for example control currents for effecting a desired damping response in an MR based damper.

Generally under normal vehicle operation, suspension control is preferably provided in accordance with normal ride and handling (R&H) objectives, and open open-loop controls are employed wherein all the dampers at each corner of the vehicle are controlled relative to inputs such as lateral acceleration, vehicle speed, steering wheel angle and damper position. Such open loop controls are effective during linear driving conditions (e.g., substantially neutral oversteer/understeer condition). One skilled in the art will appreciate that such controls are generally designed to effect a baseline total vehicle damping and baseline distribution thereof to each vehicle corner. Total vehicle damping force generally increases with increasing vehicle velocity and decreases with decreasing vehicle velocity to effect R&H objectives. Additionally, redistribution of the total vehicle damping force will be effected based substantially upon steering input. Such normal R&H damper control commands are, as described hereinabove, determined by damper controller and implemented thereby, for example, as current control commands issued to each of the RF, LF, RR and LR damper actuators in accordance with a R&H calibration as further described hereinbelow.

Non-linear driving conditions wherein vehicle oversteer or understeer behavior or a transitional neutral steer behavior out of or intermediate oversteer and understeer states are determined and counteracted by ESC controls of the supervisory controller 10. Such ESC control includes preferential implementation of closed-loop active damper control of some or all of the vehicle corner dampers. ESC damper control is effective to determine an effective total vehicle damping, and front-to-rear and side-to-side distributions thereof. One skilled in the art will recognize that understeer behavior can be improved with a damping distribution weighted toward the rear of the vehicle and that oversteer behavior can be improved with a damping distribution weighted toward the front of the vehicle. Furthermore, certain of the vehicle corner and damper motion combinations may be determined critical in accordance with the vehicle turning direction and benefiting from such ESC damper control whereas certain of the vehicle corner and damper motion combinations may be determined non-critical in accordance with the vehicle turning direction and may be adequately controlled in accordance with normal ride and handling objectives with the R&H controls. ESC damper control commands are determined by supervisory controller 10 and implemented by the damper controller 25, for example, as current control commands issued to each of the RF, LF, RR and LR damper actuators in accordance with a ESC calibration as further described hereinbelow.

In a preferred embodiment, the R&H controls will be used to command the damping force of the non-critical vehicle corner and damper motion combinations. And, the ESC damper controls will be used to command the damping force of the critical vehicle corner and damper motion combinations. Therefore, during normal linear driving conditions, all vehicle corner damper and damper direction combinations are preferably controlled in accordance with a purely R&H calibration wherein the R&H control commands determined by damper controller 25 are provided to the respective damper actuators. During non-linear driving conditions, including oversteer, understeer and transitional neutral steer conditions, all vehicle corner damper and damper direction combinations are preferably controlled in accordance with a ESC calibration wherein the R&H control commands determined by damper controller 25 are provided to the respective damper actuators for non-critical vehicle corner and damper motion combinations whereas the ESC control commands determined by supervisory controller 10 are provided to the respective damper actuators for critical vehicle corner and damper motion combinations. The Matrix of FIG. 7 illustrates the critical and non-critical vehicle corner and damper motion combinations in accordance with vehicle turning direction. By the present invention, the ESC damper control is implemented on the dampers and in the direction of damper motion critical to the yaw dynamics of the vehicle thereby minimizing the effects of such control on potentially destabilizing wheel control events which may occur during the application of other ESC control sub-systems, e.g., wheel torque control and active steering, or disruptive road input.

Figure 5:
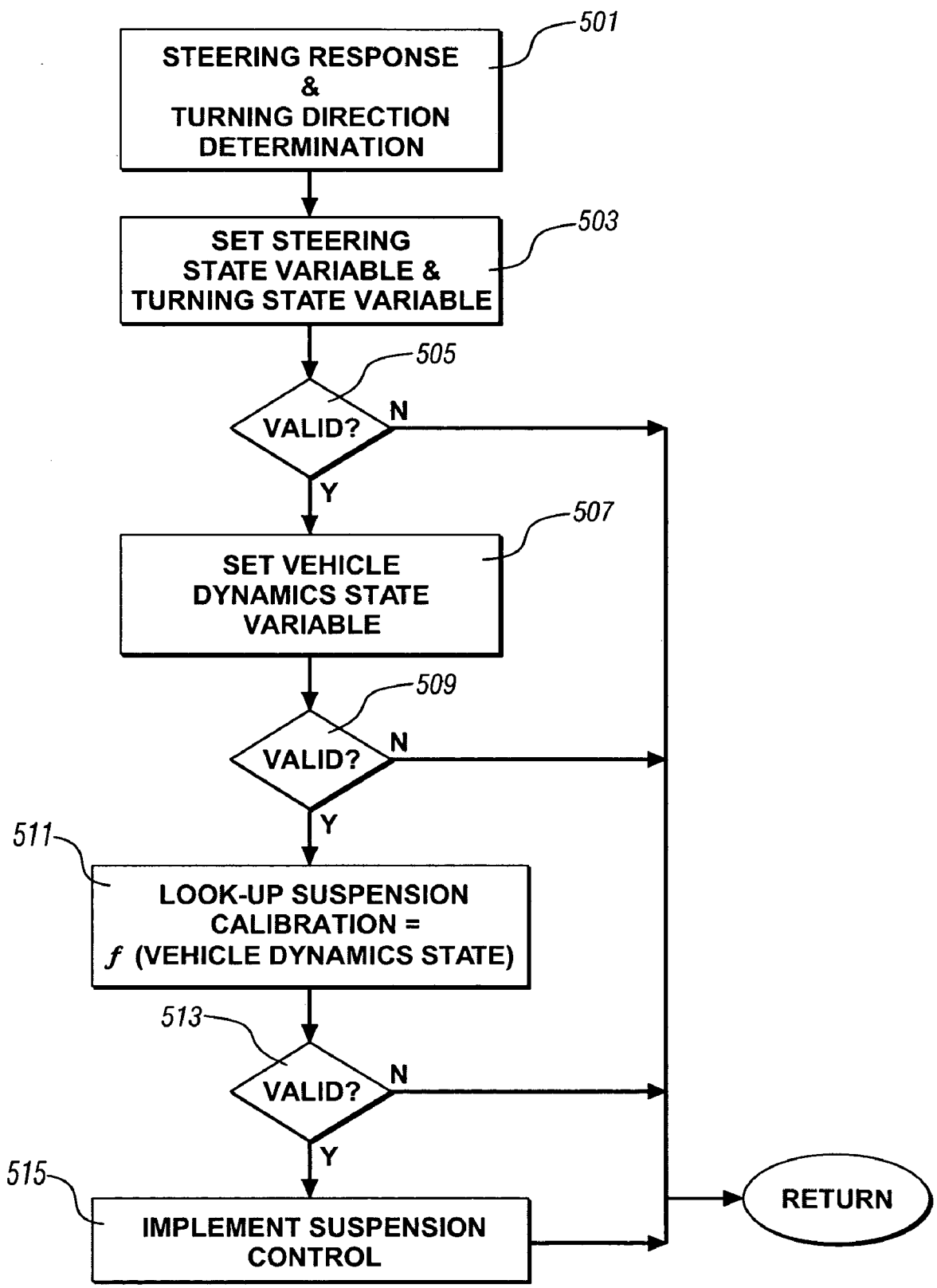
FIG. 5 is a flow chart representing exemplary functions executed in one or more computer based controllers in carrying out the method of the present invention.

FIG. 5 illustrates functions carried out in the supervisory controller 10 and the damper controller 25 in effecting the controls of the present invention. Therein is illustrated the determination of the vehicle's steering response, e.g., oversteer, understeer, neutral steer, and the vehicle's turning direction [block 501]. Next shown is setting of state variable for the vehicle steering response state and turning state as determined [block 503]. Variables are generally understood in the art to correspond to assigned and addressable memory locations or registers within dynamic memory modules of the controllers, e.g., random access memory, and may comprise one or more bits of such multi-bit memory locations. At various steps within the processes carried out by the controllers 10 and 25, validity checks are performed [block 505] relative to known good variable settings for the vehicle steering response state and turning state variables, for example as part of executory diagnostic routines for the purpose of ensuring the integrity and security of the state data. Valid state variables result in the continuance of the present steps [block 507] whereas invalid state variables result in exiting of the routine in favor of additional diagnosis and/or recovery routines not further detailed herein.

Continuing under the assumption of validated vehicle steering response state and turning state variables [block 507], a vehicle dynamics state variable is set corresponding to the vehicle steering response state and turning state. The vehicle dynamics state corresponds to the combined turning direction and steering response and includes, at a minimum, oversteer-left, oversteer-right, understeer-left and understeer-right. The variable may further include neutral steer-left and neutral steer-right representing transitional neutral steer conditions. Similar to the previously described validity checks performed upon the vehicle steering response state and turning state variables, at various steps within the processes carried out by the controllers 10 and 25, validity checks are performed [block 509] relative to known good variable settings for the vehicle dynamics state variable, for example as part of conventional executory diagnostic routines for the purpose of ensuring the integrity and security of the state data. A valid state variable results in the continuance of the present steps [block 511] whereas invalid state variables result in exiting of the routine in favor of additional diagnosis and/or recovery routines not further detailed herein.

Continuing under the assumption of a validated vehicle dynamics state variable [block 511], suspension damper calibrations are referenced as a function of the validated vehicle dynamics state variable. Calibrations are generally understood in the art to correspond to assigned and addressable memory locations or registers within non-volatile memory modules of the controllers, e.g., random object memory, and may comprise one or more bits of such multi-bit memory locations. Similar to the previously described validity checks performed upon the various vehicle state variables, at various steps within the processes carried out by the controllers 10 and 25, validity checks are performed [block 513] relative to known good calibration values for the suspension damper calibrations, for example as part of executory diagnostic routines for the purpose of ensuring the integrity and security of the calibration data. A valid calibration results in the continuance of the present steps [block 515] whereas invalid calibrations result in exiting of the routine in favor of additional diagnosis and/or recovery routines not further detailed herein. Continuing under the assumption of a validated calibration [block 515], damper control is implemented in accordance with the referenced and validated calibration to effect the desired damping commands at the vehicle corners.

A more detailed explanation of the functions set forth above with respect to the illustration of FIG. 5, particularly with respect to data integrity and security aspects thereof, is now provided. Beginning first with the setting of state variable for the vehicle steering response state and turning state [block 503], FIGS. 2 and 3 are additionally referenced. The variable associated with steering response state is shown in FIG. 2 as including a two-bit position allocation in systems wherein neutral steer is not a utilized state. In systems wherein neutral steer is a utilized state, a three-bit position variable is allocated. Bit position allocations are preferably adjacent bits in larger bit arrays, typically comprising 8, 16 or 32 bit words in accordance with the controller employed architecture. Unutilized word bits—for the purposes of the present variable definitions—are preferably allocated to other variable usage and hence packed with other non-related variable data not required to be further detailed herein. In the illustrated two-bit allocation scenarios shown in the chart of FIG. 2, valid state variable values are illustrated. For each of the two- and three-bit scenarios, valid variable values share a common ratio of individual bit states. In the two-bit allocation this ratio is one-to-one of "1" and "0", whereas in the three-bit allocation this ratio is two-to-one of "1" and "0". Furthermore, each of the valid variable values within each respective two- or three-bit allocation is differentiated from the others by differences between at least two complementary bits. In the two-bit allocation, there are only two bits and each valid value comprises complementary bits. Therefore, the first bit (taken from right to left) corresponding to the oversteer state "1" differs from the first bit corresponding to the understeer state "0", and the second bit corresponding to the oversteer state "0" differs from the second bit corresponding to the understeer state "1". Invalid variable values for the two-bit steering response allocation include "00" and "11". In the three-bit allocation, there are three bits and each valid value comprises two pair groupings of complementary bits—the first and one of the second and third bits; the second and one of the first and third bits; and the third and one of the first and second bits. The first and second position complementary bits of the understeer value "110" both differ from the first and second position complementary bits of the oversteer value "101". Similarly, the second and third position complementary bits of the oversteer value "101" both differ from the second and third position complementary bits of the neutral steer value "011". And, the first and third position complementary bits of the understeer value "110" both differ from the first and third position complementary bits of the neutral steer value "011". Invalid variable values for the three-bit steering response allocation include "000", "001", "010", "100" and "111". While the ratio of two-to-one of "1s" and "0s" respectively is exemplified, one skilled in the art will recognize that the complementary or inverted arrangement using the ratio of two-to-one of "0s" and "1s", respectively, is equally applicable.

The variable associated with turning response state is shown in FIG. 3 as including a two-bit position allocation. Consistent with the considerations set forth hereinabove with respect to the steering state variable, bit position allocations are preferably adjacent bits in larger bit arrays, typically comprising 8, 16 or 32 bit words in accordance with the controller employed architecture. Unutilized word bits are preferably allocated to other variable usage and hence packed with other non-related variable data. Valid state variable values are illustrated in FIG. 3 wherein valid variable values share a common ratio of individual bit states of one-to-one of "1s" and "0s". Furthermore, each of the valid variable values is differentiated from the other by differences between these two complementary bits. Each valid value comprises complementary bits and, therefore, the first bit corresponding to the left turning state "1" differs from the first bit corresponding to the right state "0" and the second bit corresponding to the left turning state "0" differs from the second bit corresponding to the right state "1". Invalid variable values for the two-bit turning direction allocation include "00" and "11".

Turning now to the setting of the variable associated with vehicle dynamics state which comprises combinational information from validated steering response state, including transitional neutral steer, and turning direction state variables [block 507], FIG. 4 illustrates a four-bit position allocation. Consistent with the considerations set forth hereinabove with respect to the previously described individual state variable for steering response and turning direction, bit position allocations for the present vehicle dynamics state variable are preferably adjacent bits in larger bit arrays (e.g., 8, 16 or 32 bit words) in accordance with the controller employed architecture. Unutilized word bits are preferably allocated to other variable usage and hence packed with other non-related variable data. Valid state variable values are illustrated wherein valid variable values share a common ratio of individual bit states of two "1s" and two "0s". In the four-bit allocation, there are four bits and each valid value comprises four pair groupings of complementary bits—one of the bits of a first state, e.g., "1", paired individually with the two of the bits of the second state "0" and the other of the bits of the first state, e.g., "1", paired individually with the two of the bits of the second state "0". Any valid vehicle dynamics variable value differs from any other valid vehicle dynamics variable value by differences between at least two complementary bits. For example, variable values corresponding to understeer-left "0110" and understeer-right "1100" differ in such a fashion with respect to the second and fourth position complementary bits. In a further example, variable values corresponding to understeer-left "0110" and neutral steer-left "1001" differ in such a fashion with respect to the first, second, third and fourth position complementary bits. All other valid binary coded values can be compared in such a fashion to arrive at the same result. Invalid variable values for the four-bit vehicle dynamics allocation include "0000", "1111" and any four-bit combination having three bit positions written with either "0s" or "1s".

Appreciated from the above description of the various individual and combinatorial state variables is that valid binary coded variables require compliance with a predetermined ratio of individual bit states and differentiation one from another by differences between at least two complementary bits which effectively requires two bit transitions in opposite directions for a state change to be indicated. Furthermore, an additional level of security is afforded to certain selected anomalous transitions which may occur between valid values of state variables. It is preferred that undesirable effects of anomalous transitions between valid values of state variable be managed through design selection of valid values of the state variables such that predetermined undesirable state transitions are avoided for the more common types of controller related anomalies. For example, register shifting, including arithmetic logic unit multiplication operations, and register inversion including arithmetic logic unit one's complement operations, are common valid operations which if anomalistically performed can result in transition of a state variable from one valid value to another valid value but which corresponding state transition represented thereby is unintended and undesirable. In the present exemplary system, unintended oversteer states, both with respect to vehicle steering response state variable (FIG. 2) and vehicle dynamics state variable (FIG. 4) are desirably afforded the highest level of security whereby such previously described anomalistic transitions among variable values will not result in the transition the system into an oversteer state from a non-oversteer state. In the present example, any oversteer state is the least desirable state to transition into in the event of an anomalistic state variable change and is desirably afforded the highest level of security. Therefore, valid state variable values are chosen for oversteer conditions such that no two adjacent bit positions are the same (e.g., adjacent bits are different). This is shown in the vehicle steering response variable settings of FIG. 2 wherein the valid three bit variable value for oversteer is "101". This is also shown in the vehicle dynamics state variable settings of FIG. 4 wherein the valid four bit variable value for oversteer-left is "0101" and for or oversteer-right is "1010". Appreciated from such design selection is that the highest level of security against the described more common types of controller related anomalies (e.g., register shifts and bit inversions). Hence, the present invention provides an otherwise unrealizable level of security and integrity against bit, nibble, byte and word failures since each at least two bits of a variable must change in opposite directions to signify any state change. And, additional security can be provided against certain anomalistic state changes by selective assignment of valid sate variables. Such a scheme provides these benefits in an efficient binary digit resource allocation allowing for shared bit resource within the architected word structures of the computer based controllers.

Having thus described the data integrity and security aspects of an electronic stability control system suitable for implementation and application with any or all of a variety of individual stability control sub-systems, e.g., wheel torque (i.e., brake & engine torque), steering and suspension, the further aspect of calibration integrity particularly relevant to the implementation of damper suspension controls [515] is now described with additional reference to the chart of FIG. 6. Along the top of the chart of FIG. 6 are columns differentiating, for a four corner vehicle, the eight vehicle corner and damper motion combinations comprising LF jounce, LF rebound, RF jounce, RF rebound, LR jounce, LR rebound, RR jounce and RR rebound. Along the right side of the chart are rows differentiating four exemplary vehicle dynamic states as previously described as oversteer-left, oversteer-right, understeer-left and understeer-right. For each of the eight vehicle corner and damper motion combinations are two valid two-bit patterns comprising mutually exclusive calibrations for effecting either ESC control commands or R&H commands at the respective vehicle corner and damper motion combination. For example, an ordered two-bit pattern of "10" corresponds to a calibration indicative of the desirable control of the corresponding vehicle corner and damper motion combination in accordance with the ESC determined control commands. Similarly, the inverted ordered two-bit pattern of "01" corresponds to a calibration indicative of the desirable control of the corresponding vehicle corner and damper motion combination in accordance with the R&H determined control commands. A complete calibration corresponding to a particular vehicle dynamics state, for example oversteer left, comprises a 16-bit calibration word including, for each vehicle corner and damper motion combination, one of the valid two-bit patterns. Thus, each defined vehicle dynamics state has a corresponding calibration defining each vehicle corner and damper motion combination control. Each of the eight vehicle corner and damper motion combinations can be calibrated, in the present example, for control with either of the ESC control commands or the R&H commands in accordance with the designer and calibrator's desired objectives. An additional calibration corresponding to a pure R&H control—such as, for example, where non-linear driving conditions are not present and do not require electronic stability enhancements—may similarly be provided and may comprise a 16-bit calibration word wherein all individual two-bit patterns are set to "01" to effect damper control in accordance with the R&H control commands exclusively. In a manner similar to the various state variables described hereinabove, valid calibrations can be confirmed. The valid vehicle corner and damper motion combination calibration values are illustrated in FIG. 6 wherein valid calibration values share a common ratio of individual bit states of one "1" and one "0". Furthermore, each of the valid calibration values is differentiated from the other by differences between these two complementary bits. Each valid value comprises complementary bits and, therefore, the first bit corresponding to a ESC inactive (R&H active) calibration "1" differs from the first bit corresponding to the ESC active (R&H override) "0" and the second bit corresponding to the ESC inactive (R&H active) "0" differs from the second bit corresponding to the ESC active (R&H override) "1". Invalid calibration values for the two-bit calibration allocation include "00" and "11".

As an exemplary implementation of the calibration thus described, the damper controller 25 is tasked with executing control commands, for example current control of the damper actuators, that are either determined by control routines executed and carried out within the instruction sets therein related to R&H control or determined by control routines executed and carried out within the instruction sets of the supervisory controller 10 related to ESC control. Thus, data transfers between the supervisory controller 10 and the damper controller 25 occur including the transfer of ESC control commands and ESC calibrations. The damper controller is then tasked with interpreting the calibration and providing the appropriate control commands, ESC or R&H, in accordance with the individual vehicle corner and damper motion calibrations provided thereto. This scenario provides an example of the validation opportunities for the control to act upon the calibration wherein subsequent to transfer to the damper controller 25 the calibration is validated with respect to known good calibration states.

An alternative implementation of calibrations as described includes calibrations that are derived in accordance with dynamic determinations. That is to say, individual vehicle corner and damper motion direction calibration words may be determined on the fly as a function of predetermined vehicle operating parameters and stored in a read-write memory devices as opposed to being predetermined, stored in a non-volatile memory device and later referenced as described hereinabove. Such dynamic operations benefit to an even greater degree from the security and integrity aspects of the suspension control calibration as described hereinabove particularly in as much as increased data manipulation affords additional opportunity for data corruption.

The invention has been described with respect to certain exemplary embodiments. However, it is to be understood that various modifications and alternative implementations of the invention may be practiced without departing from the scope of the invention as defined in the following claims.

We claim:

1. Method for controlling a vehicular suspension in a vehicle having a plurality of independently controllable suspension units including independent jounce and rebound control capabilities comprising:

providing a calibration memory device having a first pair of bits corresponding to jounce control and a second pair of bits corresponding to rebound control for each of a plurality of predetermined vehicle driving condition states and for each of said plurality of independently controllable suspension units wherein a first complementary arrangement of the first pair of bits corresponds to a first jounce control calibration, and wherein a second complementary arrangement of the first pair of bits corresponds to a second jounce control calibration, and wherein the first complementary arrangement of the second pair of bits corresponds to a first rebound control calibration, and wherein the second complementary arrangement of the second pair of bits corresponds to a second rebound control calibration;

determining which one of the plurality of the predetermined vehicle driving condition states is active;

selecting from the calibration memory device the respective first and second pairs of bits for each of the plurality of independently controllable suspension units corresponding to the active one of the plurality of the predetermined vehicle driving condition states; and controlling each of the plurality of independently controllable suspension units in accordance with the complementary arrangements of the respective first and second pairs of bits.

2. The method for controlling a vehicular suspension as claimed in claim 1 wherein determining which one of the plurality of the predetermined vehicle driving condition states is active comprises:

providing a memory location within a memory device for storing valid binary codes corresponding to vehicle driving condition states; and storing within the memory location valid binary codes;

wherein each valid binary code has a first ratio of individual bit states and is differentiated from other valid binary codes by differences between at least two complementary bits.

3. The method for controlling a vehicular suspension as claimed in claim 2 wherein valid binary codes that have no identical adjacent bits correspond to an oversteer vehicle driving condition state.

4. The method for controlling a vehicular suspension as claimed in claim 1 wherein respective first and second pairs of bits are stored in predetermined ones of the first and second complementary arrangements in a non-volatile memory device.

5. The method for controlling a vehicular suspension as claimed in claim 1 wherein respective first and second pairs of bits are set to ones of the first and second complementary arrangements in a read-write memory device as a function of predetermined vehicle operating parameters.

6. The method for controlling a vehicular suspension as claimed in claim 1, wherein jounce and rebound control of each suspension unit are respectively effectuated by one of (i) electronic stability control (ESC) commands, and (ii) ride and handling control (R&H) commands, depending upon the respective first pair of bits and the second pair of bits.

7. Computer-based vehicular suspension control system for controlling a plurality of independently controllable suspension units including independent jounce and rebound control capabilities comprising:

a programmable controller operating under the control of a program to control each of the plurality of independently controllable suspension units in accordance with calibrations corresponding to a plurality of vehicle driving condition states; and a calibration memory device having a first pair of bits corresponding to jounce control and a second pair of bits corresponding to rebound control for each of the plurality of predetermined vehicle driving condition states and for each of the plurality of independently controllable suspension units wherein a first complementary arrangement of the first pair of bits corresponds to a first jounce control calibration, and wherein a second complementary arrangement of the first pair of bits corresponds to a second jounce control calibration, and wherein the first complementary arrangement of the second pair of bits corresponds to a first rebound control calibration, and wherein the second complementary arrangement of the second pair of bits corresponds to a second rebound control calibration.

8. The computer-based vehicular suspension control system as claimed in claim 7 wherein said plurality of predetermined vehicle driving condition states are stored as valid binary codes within a memory device wherein each valid binary code is characterized by a predetermined ratio of corresponding bit states and is differentiated from all other valid binary codes by differences between at least two complementary bits of each respective valid binary code.

9. The computer-based vehicular suspension control system as claimed in claim 8 wherein valid binary codes that have no identical adjacent bits correspond to an oversteer vehicle driving condition state.

10. The computer-based vehicular suspension control system as claimed in claim 8 wherein the memory device comprises a non-volatile memory device and the respective first and second pairs of bits are stored therein in predetermined ones of the first and second complementary arrangements.

11. The computer-based vehicular suspension control system as claimed in claim 8 wherein the memory device comprises a read-write memory device and the respective first and second pairs of bits are periodically set therein to ones of the first and second complementary arrangements as a function of predetermined vehicle operating parameters.

12. The computer-based vehicular suspension control system as claimed in claim 7, wherein jounce and rebound control of each suspension unit are respectively effectuated by one of (i) electronic stability control (ESC) commands, and (ii) ride and handling control (R&H) commands, depending upon the respective first pair of bits and the second pair of bits.

* * * * *